United States Patent
Terre et al.

(10) Patent No.: US 7,340,162 B2
(45) Date of Patent: Mar. 4, 2008

(54) INFRARED CAMERA SYSTEMS AND METHODS

(75) Inventors: Bill Terre, Santa Barbara, CA (US); Joseph Kostrzewa, Buellton, CA (US); Jan-Erik Källhammer, Linköping (SE); Tobias Höglund, Linköping (SE)

(73) Assignees: Flir Systems, Inc., Wilsonville, OR (US); Autoliv Development AB, Vårgårda (SE)

( * ) Notice: Subject to any disclaimer, the term of this patent is extended or adjusted under 35 U.S.C. 154(b) by 341 days.

(21) Appl. No.: 11/064,987

(22) Filed: Feb. 23, 2005

(65) Prior Publication Data

US 2006/0188246 A1    Aug. 24, 2006

(51) Int. Cl.
*G03B 17/00* (2006.01)
*H01L 31/00* (2006.01)
*H04N 7/18* (2006.01)
*G06K 9/36* (2006.01)

(52) U.S. Cl. .............. 396/275; 250/330; 348/148; 382/104; 382/276

(58) Field of Classification Search .......... 396/275; 382/104, 276; 348/148; 250/330, 332
See application file for complete search history.

(56) References Cited

U.S. PATENT DOCUMENTS 5,799,106 A    8/1998  Mooney et al.
6,850,642 B1    2/2005  Wang
2003/0146383 A1    8/2003  Knauth
2004/0165749 A1*   8/2004  Holz et al. ............. 382/104

FOREIGN PATENT DOCUMENTS

EP         1 333 660           8/2003
WO    WO 2004/070449           9/2004

OTHER PUBLICATIONS

International Search Report, Jun. 26, 2006, 14 pages.

* cited by examiner

*Primary Examiner*—W. B. Perkey
(74) *Attorney, Agent, or Firm*—MacPherson Kwok Chen & Heid LLP; Greg J. Michelson

(57) ABSTRACT

Systems and methods provide infrared camera techniques that may improve image quality or infrared camera performance over a range of varying conditions. For example, in accordance with an embodiment of the present invention, a system is disclosed that transforms data provided by an infrared camera based upon environmental conditions at the time the data was obtained. As an example, the image quality provided by the infrared camera may be improved over a range of environmental conditions by the proper transformation of the data based upon the sensor's information.

27 Claims, 1 Drawing Sheet

INFRARED CAMERA SYSTEMS AND METHODS

TECHNICAL FIELD

The present invention relates generally to cameras and, more particularly, to infrared cameras and systems (e.g., for vehicle applications).

BACKGROUND

Infrared cameras are known and utilized in a variety of applications. One typical configuration of an infrared camera includes a two-dimensional array of microbolometer elements used to sense infrared radiation. Each microbolometer element functions as a pixel to produce a two-dimensional image based on detected infrared radiation. The change in resistance of each microbolometer element is translated into a time-multiplexed electrical signal by circuitry known as the read out integrated circuit (ROIC). The combination of the ROIC and the microbolometer array is commonly known as a microbolometer focal plane array (FPA) or microbolometer infrared FPA.

One drawback, for example, of a conventional infrared camera is that the infrared image provided by the ROIC, which may be stored or displayed, may not take into account the conditions at the time the infrared image was taken. As an example, the conditions may be external or internal to the infrared camera, such as for example, environmental conditions that may affect the appearance of the infrared image. As a result, there is a need for techniques that address infrared camera performance under varying environmental conditions.

SUMMARY

Systems and methods are disclosed herein to provide infrared camera techniques that may improve image quality or infrared camera performance over a range of varying conditions. For example, in accordance with an embodiment of the present invention, a system is disclosed that transforms data provided by an infrared camera based upon environmental conditions at the time the data was obtained. As an example, the system may be incorporated into a vehicle, with information regarding the environmental conditions provided by the vehicle's sensors. The image appearance provided by the infrared camera may be improved over a range of environmental conditions, for example, by selecting the proper transformation for the data and/or by adjustments to a display (e.g., adjusting brightness, contrast, and/or gamma) based upon the sensor's information.

More specifically, in accordance with one embodiment of the present invention, an infrared camera system includes an infrared camera adapted to provide infrared image data; at least one sensor adapted to provide environmental information; and a controller adapted to receive the environmental information from the at least one sensor and, based on the environmental information, select a transformation from a plurality of transformations to apply to the infrared image data.

In accordance with another embodiment of the present invention, an infrared camera system includes an infrared camera adapted to provide infrared image data; means for receiving information based on environmental conditions associated with the image data; and means for applying a first transformation to the image data based on the information on the environmental conditions.

In accordance with another embodiment of the present invention, a method of transforming infrared camera data based on environmental conditions includes receiving information based on the environmental conditions; determining a first transformation to apply to the infrared camera data based on the environmental conditions; and applying the first transformation to the infrared camera data. Subsequently, for example, if environmental conditions change, an alternate transformation can be applied to optimize the image appearance.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
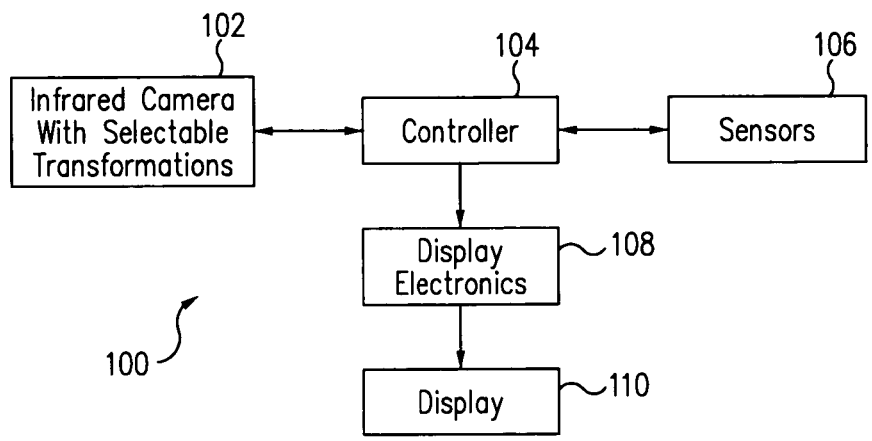
FIG. 1 shows a system block diagram with an infrared camera in accordance with an embodiment of the present invention.

FIG. 1 shows a block diagram of a system 100 in accordance with an embodiment of the present invention. System 100 includes an infrared camera 102, a controller 104, one or more sensors 106, display electronics 108, and a display 110. System 100 may be incorporated, for example, into a vehicle (e.g., an automobile or other type of land-based vehicle, an aircraft, or a spacecraft) or a non-mobile installation requiring infrared images to be stored and/or displayed.

Infrared camera 102 may represent any type of infrared camera, which for example detects infrared radiation and provides representative data (e.g., one or more snapshots or video infrared images). For example, infrared camera 102 may represent an infrared camera that is directed to the near, middle, and/or far infrared spectrums. Sensors 106 represent one or more various types of sensors, depending upon the desired application or implementation requirements, which provide information to controller 104.

Controller 104 communicates with sensors 106 (e.g., by receiving sensor information from sensors 106) and with infrared camera 102 (e.g., by receiving data from infrared camera 102 and providing command, control, or other information to infrared camera 102). System 100 may also include display electronics 108 and display 110, which are utilized by system 100 to display the data (e.g., infrared images) from infrared camera 102. Display electronics 108 and display 110 may receive the data from infrared camera 102 via controller 104, as shown, or may receive the data directly from infrared camera 102.

Display electronics 108 and display 110 represent, for example, a cathode ray tube, a plasma display, a remote projection head-up display, or a liquid crystal display along with associated electronics. Alternatively, system 100 may store the data (e.g., within a memory of controller 104) from infrared camera 102 for later viewing (e.g., on a separate display) with display electronics 108 and display 110 optional components of system 100.

The various components of system 100 also may be combined, as desired or depending upon the application or requirements, with system 100 representing various functional blocks of a system in accordance with an embodiment of the present invention. For example, controller 104 may be combined to include display electronics 108, display 110, infrared camera 102, and/or one or more of sensors 106. Alternatively, controller 104 may be incorporated into infrared camera 102, with functions of controller 104 performed by circuitry (e.g., a microprocessor) within infrared camera 102.

As a specific implementation example, in accordance with an embodiment of the present invention, system 100 may be incorporated into a vehicle (e.g., an automobile) to display infrared images via display 110 to one or more of the vehicle's occupants. Controller 104 may represent, for example, an electronic control unit (ECU) of the vehicle. Sensors 106, which may be integrated into the vehicle, provide information on current environmental conditions to controller 104 (e.g., via a controller area network (CAN) bus protocol).

For example, sensors 106 may provide information regarding environmental conditions, such as outside temperature, lighting conditions (e.g., day, night, dusk, and/or dawn), humidity level, specific weather conditions (e.g., sun, rain, and/or snow), and/or whether a tunnel, a covered parking garage, or other type of enclosure has been entered or exited. Sensors 106 may represent conventional sensors as would be known by one skilled in the art for monitoring various conditions (e.g., environmental conditions) that may have an affect (e.g., on the image appearance) on the data provided by infrared camera 102.

In accordance with an embodiment of the present invention, sensors 106 (e.g., one or more of sensors 106) may also represent devices that relay information to controller 104, with the information received by sensors 106 provided, for example, via wireless communication. For example, sensors 106 within the vehicle may receive information from a satellite, through a local broadcast (e.g., radio frequency) transmission, through a mobile or cellular network, and/or through information beacons in an infrastructure (e.g., a transportation or highway information beacon infrastructure) or other wired or wireless techniques.

The information provided by sensors 106 may be evaluated and utilized by controller 104 to determine the proper operational parameters or settings for infrared camera 102. For example, by using the information provided by sensors 106 (e.g., the vehicle's sensors) regarding external environmental conditions, the most appropriate transformation may be selected (e.g., by controller 104 or infrared camera 102) and applied to the data generated by infrared camera 102. The transformation of the data, for example, may occur in infrared camera 102, in display 110, in an intermediate device (e.g., display electronics 108), or in some combination of these. Alternatively, or in addition, parameters (e.g., brightness, contrast, and/or gamma) of display 110 may be adjusted (e.g., by controller 104 directly or via display electronics 108) based on information provided by sensors 106 regarding external environmental conditions.

Specifically, in accordance with an embodiment of the present invention, the optimization of the data (e.g., image or video image) from infrared camera 102 may require the generation and/or application of a specific transformation on the data. The transformation will transform the data from a higher to a lower resolution image. For example, if infrared camera 102 provides 14-bit data, the transformation may translate the 14-bit data to 8-bit data, with the transformation applied based on the driving or environmental conditions (e.g., based on the information from the sensors 106). Consequently, by selecting and applying the most appropriate transformation to the data generated by infrared camera 102, an improved image appearance may be obtained and stored and/or displayed as compared to the image appearance that would have resulted from a single, universal transformation applied for all environmental conditions or regardless of environmental conditions.

Infrared camera 102, for example, may store a number of selectable transformations that may be applied to the data generated by infrared camera 102 or controller 104 may generate and/or store the selectable transformations and apply the selected transformation to the data provided by infrared camera 102. As an example, based on the information provided by sensors 106, controller 104 may determine the appropriate transformation corresponding to the environmental conditions and command the transformation to be applied by infrared camera 102 (e.g., via a local interconnect network (LIN) protocol between infrared camera 102 and controller 104).

Figure 2:
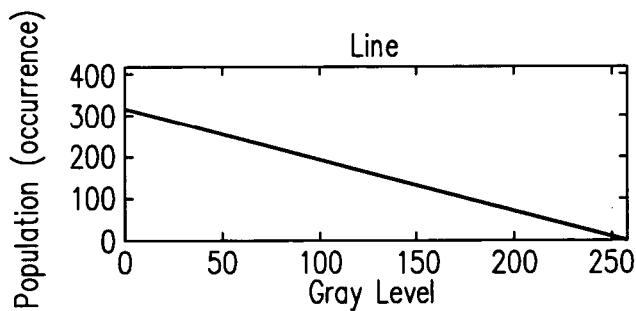
FIGS. 2 through 4 illustrate graphs for exemplary transformations for the infrared camera of FIG. 1 in accordance with an embodiment of the present invention.
Figure 3:
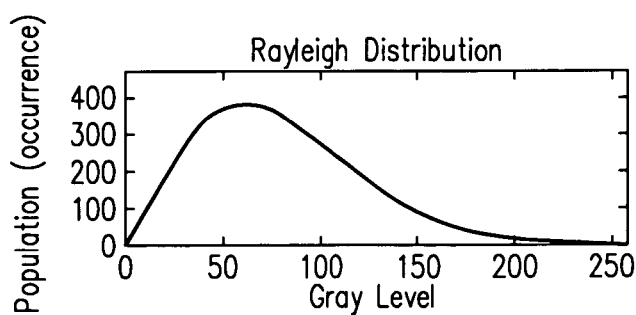
Figure 4:
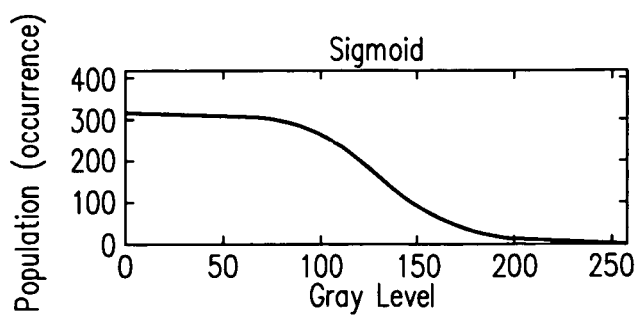

FIGS. 2 through 4 illustrate graphs for exemplary transformations for the data generated by infrared camera 102 of FIG. 1 in accordance with an embodiment of the present invention. For example, FIG. 2 illustrates an exemplary linear (ramp down) transformation, which for example may be selected for daylight, dusk, or dawn environmental conditions. The linear transformation may be represented by equation (1), where "k" equals the slope and "m" equals an offset. The value of "k" may be selected (e.g., a positive or a negative slope or no slope) for the linear transformation to provide a more optimal image appearance as a function of differing environmental conditions.

$$y(x) = kx + m \tag{1}$$

FIG. 3 illustrates an exemplary Rayleigh transformation, which for example may be selected for night or extended night-like environmental conditions. The Rayleigh transformation may be represented by equation (2), where "s" equals the location of the peak.

$$y(x) = \frac{xe^{-x^2/2s^2}}{s^2} \tag{2}$$

FIG. 4 illustrates an exemplary Sigmoid transformation, which for example may be selected for when system 100 (e.g., the vehicle having system 100 in the specific example) enters a tunnel, a parking garage, or other type of enclosure or similar sudden change in environmental conditions. The Sigmoid transformation may be represented by equation (3), where "a" equals the slope.

$$y(x) = 1 - \frac{1}{1 + e^{-ax}} \tag{3}$$

Additional logic or further transformation of the data may be performed based on information provided by sensors 106. For example, the particular transformation (e.g., Rayleigh)

may be altered, distorted, or skewed as desired to change or further enhance the image appearance as a function of the environmental conditions.

Furthermore, it should be understood that the transformations illustrated are exemplary and that a wide variety of transformations (e.g., piece-wise linear, Gaussian, or inverse Sigmoid or transformation permutations and variations) may be employed, as would be understood by one skilled in the art based on the techniques discussed herein. For example, in accordance with one or more embodiments of the present invention, various types of transformation techniques (e.g., histogram or spatial transformations, including for example histogram specifications, histogram projections, histogram regressions, and/or histogram equalizations) may be applied to the data generated by infrared camera 102 based on environmental information provided by sensors 106.

Additionally, or as an alternative, display settings for display 110 may be adjusted based on environmental information provided by sensors 106. For example, controller 104 (directly or via display electronics 108) may adjust one or more settings of display 110 based on environmental information provided by sensors 106. For example, controller 104 may adjust a brightness setting, a contrast setting, and/or a gamma setting of display 110. Thus, for example, an image optimization algorithm may be performed by controller 104 to control infrared camera 102 and/or display 110 to optimize the data and/or the image appearance based on environmental information.

As an example for the techniques discussed above, if rain is detected or if, due to other environmental conditions, there is a low dynamic range of the image data from infrared camera 102, a different transformation may be selected or the transformation applied may have one or more of its parameters adjusted to account for the environmental condition. Alternatively, or in addition, the display setting of display 110 may be adjusted to enhance the appearance of the images being displayed (e.g., brightness, contrast, and/or gamma incremented by one or two increments). Furthermore, interpolation may be performed to smoothly transition when switching from the application of one transformation to another as applied to the data generated by infrared camera 102 or when changing the display settings of display 110.

The display settings of display 110 may also be determined based on the selected transformation and/or the current environmental conditions. For example, the brightness and contrast settings of display 110 may be adjusted to −3 and +3, respectively, from their nominal values when the linear transformation is applied. As another example, the brightness and contrast settings of display 110 may be adjusted to +3 and −3, respectively, from their nominal values when the Rayleigh transformation or the Sigmoid transformation is applied.

In accordance with one or more embodiments of the present invention, an infrared camera is disclosed that can apply logic selectively to transform the data generated by the infrared camera to account for changing environmental conditions. The infrared image quality may be improved for system operation over a wide range of scene environments (e.g., environmental conditions).

For example, in accordance with an embodiment of the present invention, an infrared camera system is disclosed that is incorporated into a vehicle. A processor on the vehicle (e.g., the vehicle's electronic control unit or within the infrared camera) includes switching logic (i.e., decision logic) that generates and/or selects the most appropriate transform, based on information from the vehicle's sensors, to be applied to data generated by the infrared camera.

The vehicle's sensors may provide information, such as for example day or night, dusk or dawn, whether the vehicle has entered a covered structure (e.g., a tunnel), and/or the specific weather condition (e.g., sun, rain, or snow). The processor may select one from among a number of data transforms to apply to the data generated by the infrared camera (e.g., determines the mode for the infrared camera) based on the information from the vehicle's sensors.

Consequently, the infrared images being displayed may be dynamically optimized (i.e., in real time) by applying the appropriate transform to the data based on real-time sensor information (e.g., environmental conditions). When switching from the application of one transform to another transform as the environmental conditions change, the infrared camera may interpolate from one mode to the next (e.g., interpolation from one transform to the next) so that a gradual rather than a sudden change occurs in the images being displayed. Furthermore, display settings may be automatically adjusted based on the environmental conditions or on the selected transformation to further enhance the images being displayed.

Embodiments described above illustrate but do not limit the invention. It should also be understood that numerous modifications and variations are possible in accordance with the principles of the present invention. Accordingly, the scope of the invention is defined only by the following claims.

We claim:

1. An infrared camera system comprising:
   an infrared camera adapted to provide infrared image data;
   at least one sensor adapted to provide environmental information; and
   a controller adapted to receive the environmental information from the at least one sensor and, based on the environmental information, select a transformation from a plurality of transformations to apply to the infrared image data to modify an image quality of the infrared image data, wherein the transformation selected converts the infrared image data to a lower resolution image.

2. The infrared camera system of claim 1, wherein the plurality of transformations comprise at least one of a linear, a Rayleigh, a Sigmoid, a piece-wise linear, a Gaussian, and an inverse Sigmoid.

3. The infrared camera system of claim 1, wherein the plurality of transformations comprise at least one of a histogram specification, a histogram projection, a histogram regression, and a histogram equalization.

4. The infrared camera system of claim 1, further comprising a display adapted to show images based on the infrared image data.

5. The infrared camera system of claim 4, wherein the controller is further adapted to adjust at least one of a brightness, a contrast, and a gamma setting of the display based on at least one of the transformation selected and the environmental information.

6. The infrared camera system of claim 1, wherein the controller is further adapted to select a different transformation from the plurality of transformations based on changes to the environmental information provided by the at least one sensor.

7. The infrared camera system of claim 1, wherein interpolation is performed when switching from a first transformation to a second transformation from the plurality of transformations.

8. The infrared camera system of claim 1, wherein the infrared camera system is incorporated into a vehicle.

9. The infrared camera system of claim 1, wherein the environmental information comprises at least one of a temperature, a light level, a humidity level, and a specific weather indication.

10. The infrared camera system of claim 1, wherein the infrared camera comprises a far infrared camera.

11. The infrared camera system of claim 1, wherein the environmental information is provided to at least one of the at least one sensor via a wireless interface.

12. An infrared camera system comprising:
an infrared camera adapted to provide infrared image data;
means for receiving information based on environmental conditions associated with the image data; and
means for applying a first transformation to the image data based on the information on the environmental conditions to modify an image quality of the infrared image data, wherein the applying of the first transformation converts the image data to a lower resolution image.

13. The infrared camera system of claim 12, wherein the infrared camera comprises a far infrared camera.

14. The infrared camera system of claim 12, wherein the receiving means comprises a wireless interface for receiving the information from at least one of a satellite, a radio broadcast, a cellular transmission, and a road side beacon.

15. The infrared camera system of claim 12, wherein the means for applying the first transformation further comprises selecting from among a number of possible transformations to provide as the first transformation based on the information on the environmental conditions.

16. The infrared camera system of claim 12, wherein the first transformation comprises at least one of a histogram specification, a histogram projection, a histogram regression, and a histogram equalization.

17. The infrared camera system of claim 12, further comprising means for displaying the image data.

18. The infrared camera system of claim 17, further comprising means for adjusting at least one of a brightness, a contrast, and a gamma setting of the displaying means based on the environmental conditions.

19. The infrared camera system of claim 12, wherein the environmental conditions comprises at least one of a temperature, a light level, a humidity level, and a specific weather condition, and wherein the infrared camera system is incorporated into a vehicle.

20. The infrared camera system of claim 12, further comprising means for interpolating between the first transformation and a second transformation applied to the image data.

21. The infrared camera system of claim 12, wherein the applying means further comprises means for applying a different transformation based on changes in the environmental conditions.

22. A method of transforming infrared camera data based on environmental conditions, the method comprising:
receiving information based on the environmental conditions;
determining a first transformation to apply to the infrared camera data based on the environmental conditions; and
applying the first transformation to the infrared camera data, wherein the applying of the first transformation converts the infrared camera data to a lower resolution image and improves an image appearance of the infrared camera data.

23. The method of claim 22, wherein the determining of the first transformation includes selecting the first transformation based on the environmental conditions from among a number of available transformations.

24. The method of claim 22, wherein the first transformation comprises at least one of a histogram specification, a histogram projection, a histogram regression, and a histogram equalization.

25. The method of claim 22, further comprising displaying the infrared camera data after the applying of the first transformation.

26. The method of claim 25, further comprising adjusting at least one of a brightness setting, a contrast setting, and a gamma setting for the infrared camera data being displayed based on the environmental conditions.

27. The method of claim 22, further comprising;
determining a second transformation to apply to the infrared camera data when the environmental conditions change;
applying the second transformation to the infrared camera data; and
interpolating from the first to the second transformation when the applying of the second transformation is performed.

* * * * *